Figure 2:
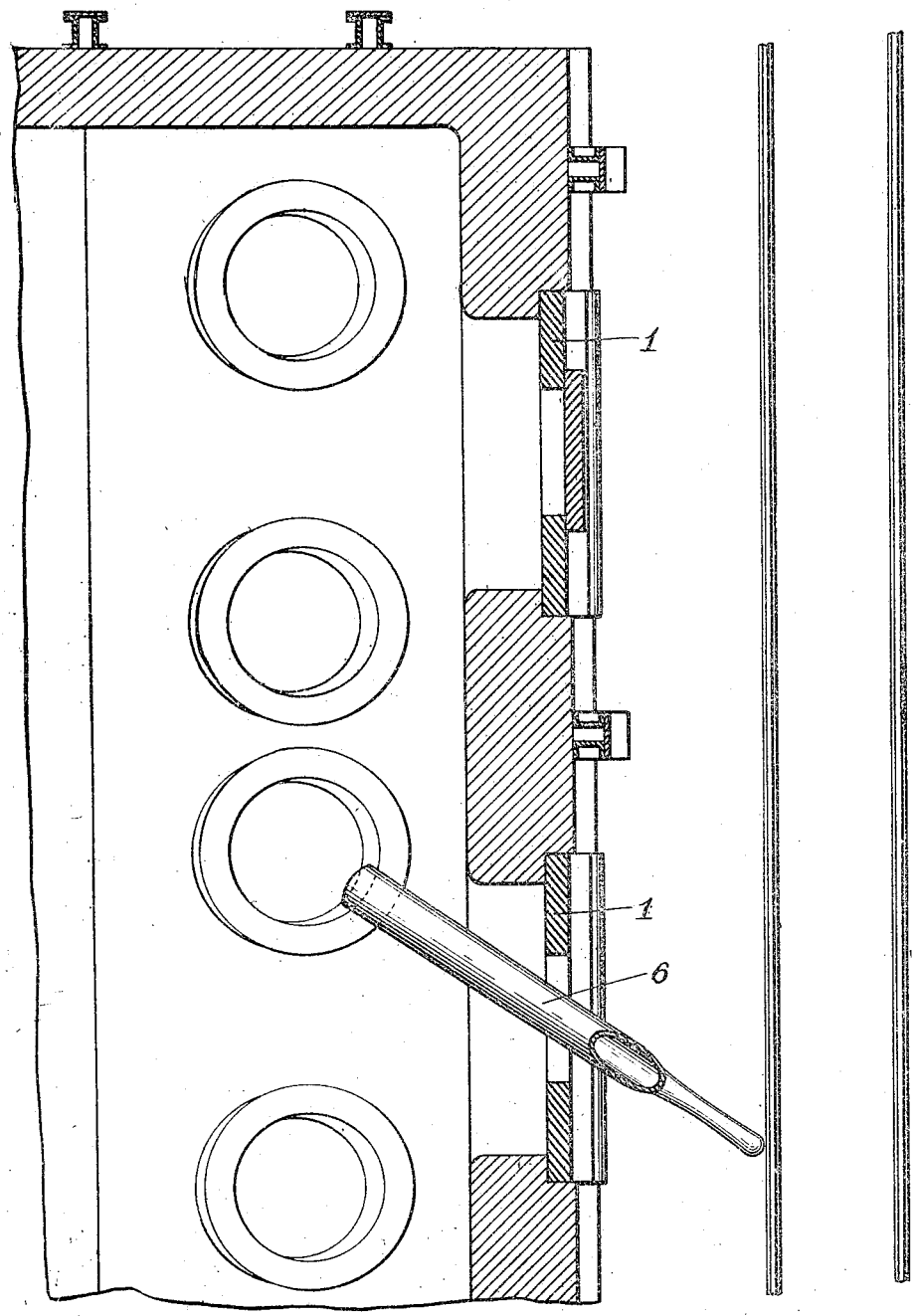

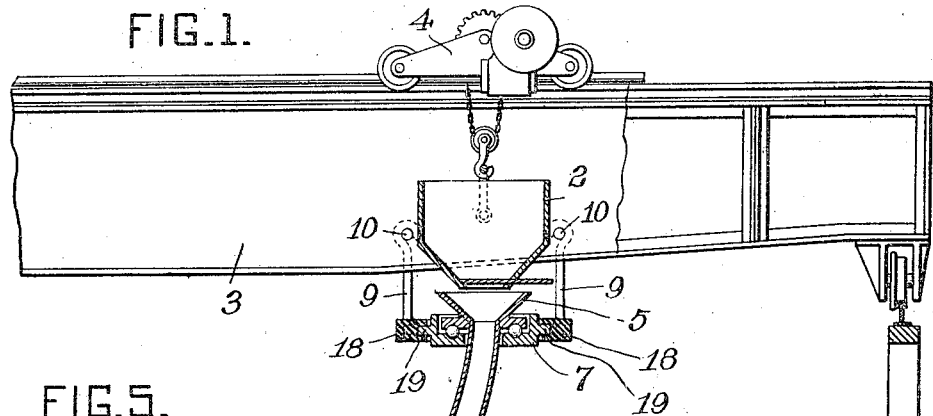
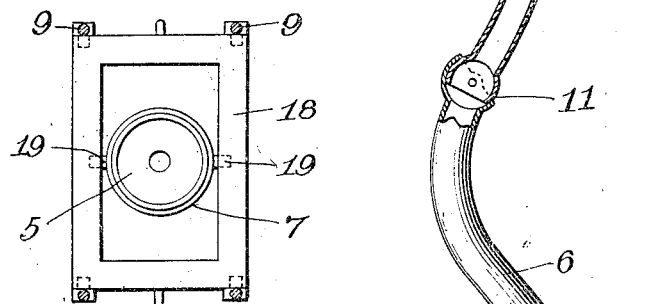
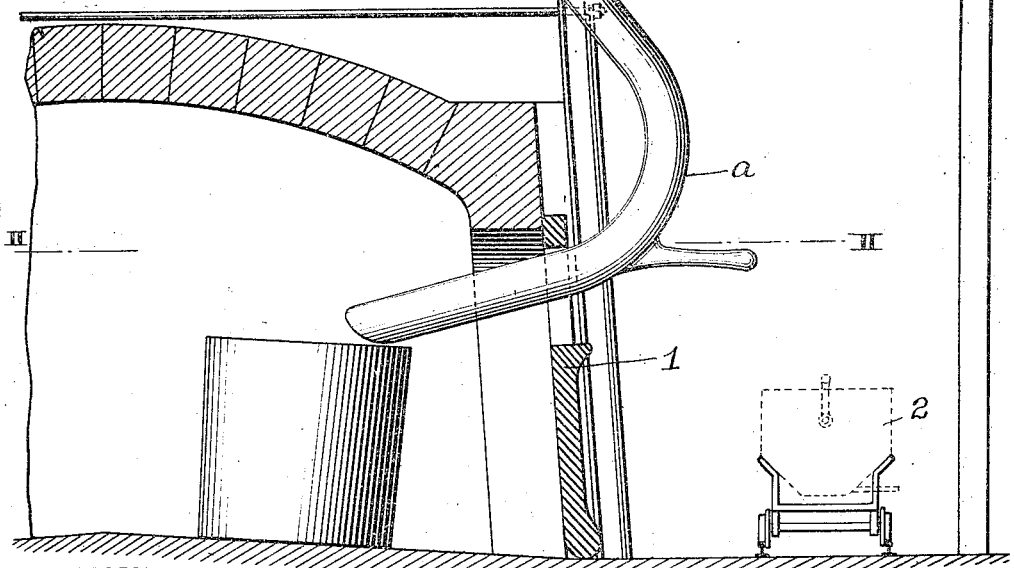

H. K. HITCHCOCK.
CHARGING GLASS POTS.
APPLICATION FILED OCT. 10, 1910.

990,555.

Patented Apr. 25, 1911.
5 SHEETS—SHEET 2.

WITNESSES:
INVENTOR

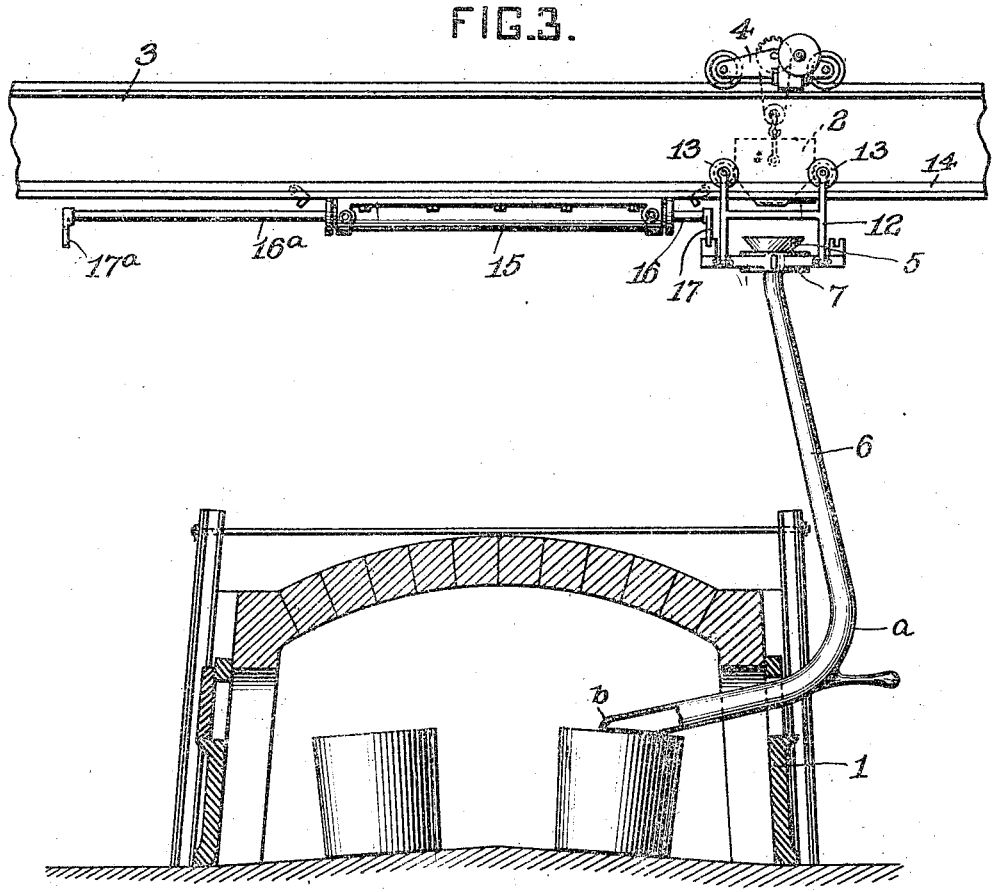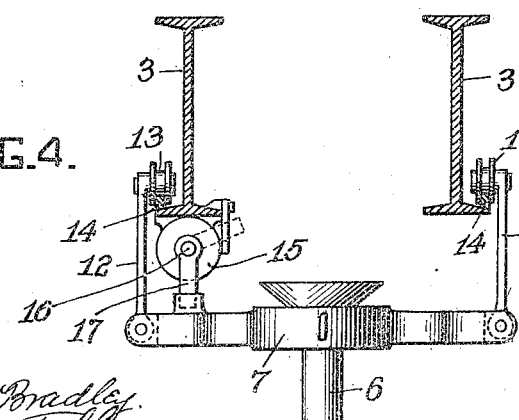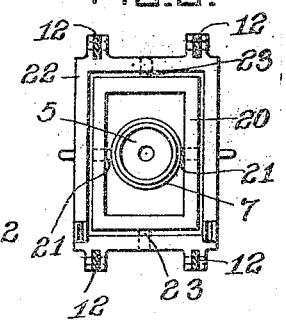

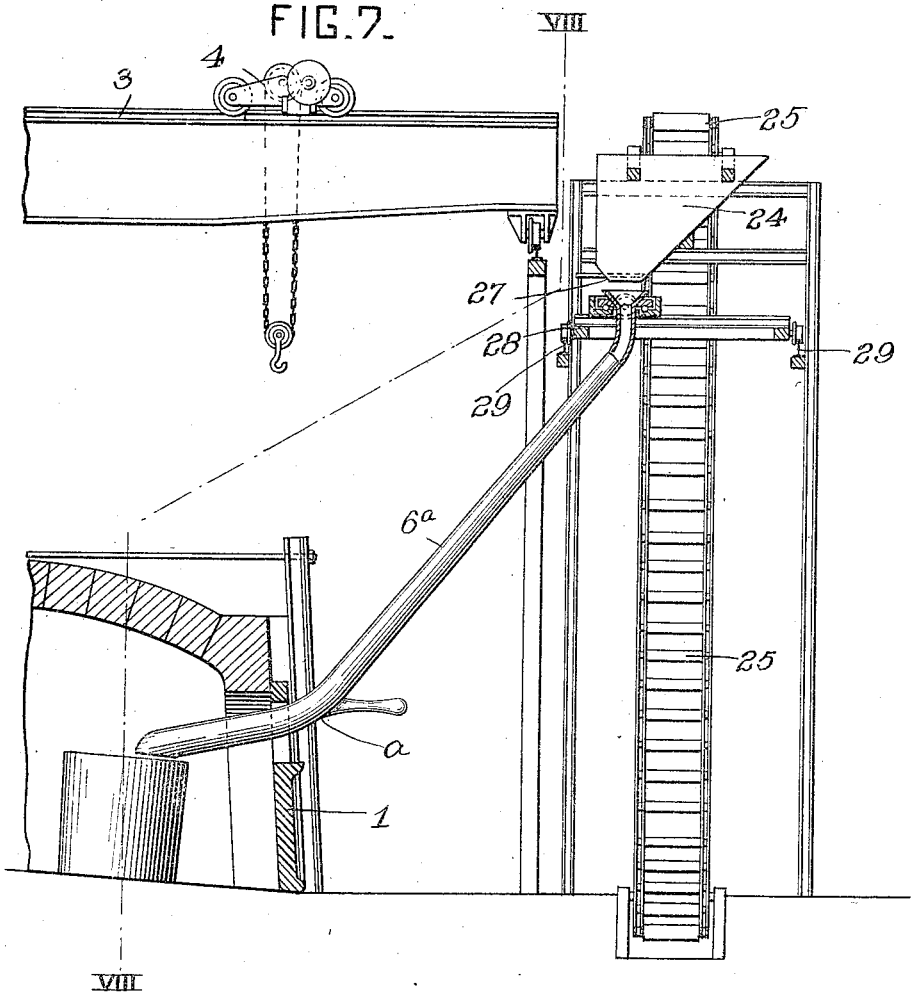

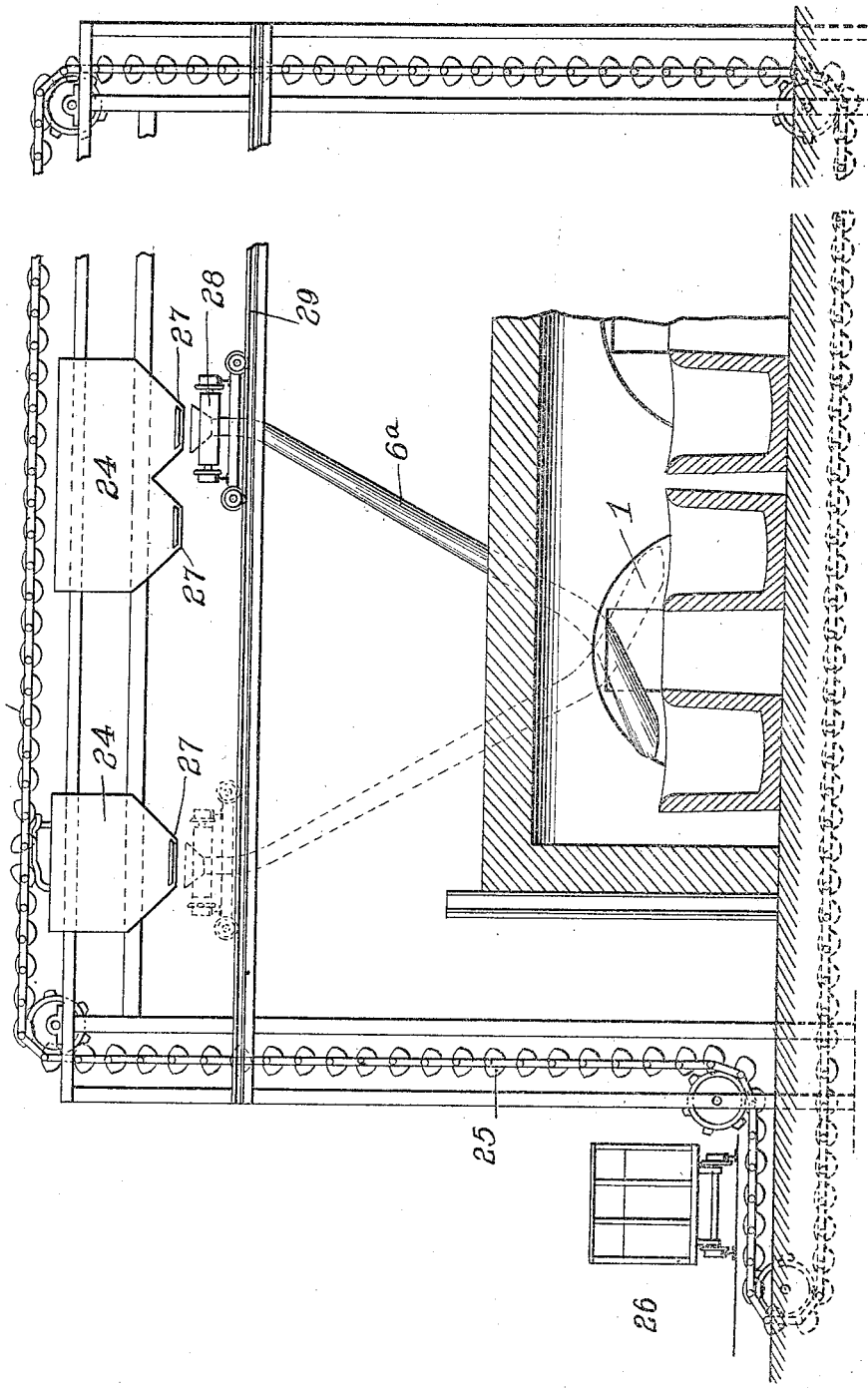

UNITED STATES PATENT OFFICE.

HALBERT K. HITCHCOCK, OF TARENTUM, PENNSYLVANIA.

CHARGING GLASS-POTS.

990,555.   Specification of Letters Patent.   Patented Apr. 25, 1911.

Application filed October 10, 1910. Serial No. 586,349.

*To all whom it may concern:*

Be it known that I, HALBERT K. HITCHCOCK, residing at Tarentum, in the county of Allegheny and State of Pennsylvania, a citizen of the United States, have invented or discovered certain new and useful Improvements in Charging Glass-Pots, of which improvements the following is a specification.

The invention described herein relates to certain improvements in charging the batch into pots while in the furnace. This charging is generally effected by laborers provided with long handled ladles which after being filled from a wheeled hopper are inserted through a charging hole in the tuille closing the opening through the furnace wall, through which the pots are inserted, and then turned depositing the material in the pots, two of which are usually charged through the same opening. This manner of charging the pots is not only slow but difficult and unpleasant on account of the heat and dust. It has been attempted to charge the pots through pipes or chutes inserted through openings formed in the arch of the furnace immediately over the pots. It has been found very difficult to close such openings sufficiently tight to prevent the escape of heat and products of combustion which will rapidly cut the walls of the openings. The most serious objections to this method is that dirt will drop through the openings in the arch into the pots and that the edges of the openings are melted under the influence of the heat and fluxing gases in the furnace, and such melted material dropping into the pot rendering the charge therein unfit for use.

The invention described herein has for its object a gravity feed of the material into the pots through an opening or openings formed in the wall or walls of the furnace above and out of line with the pots.

The invention is hereinafter more fully described and claimed.

In the accompanying drawings forming a part of this specification Figure 1 is a sectional view of a portion of a glass furnace and showing a desirable form of my improved feeding apparatus; Fig. 2 is a sectional plan view the plane of section being indicated by the line 11—11 Fig. 1, and Fig. 3 is a view partly in elevation and partly in section illustrating certain modifications in the structure of the apparatus; Fig. 4 is a sectional view on an enlarged scale showing the manner of connecting the batch guide to its support; Fig. 5 is a sectional plan on a plane indicated by the line V—V, Fig. 1, Fig. 6 is a detail plan illustrating a modification of the construction shown in Fig. 3, Fig. 7 is a sectional elevation showing a modified form of charging apparatus and Fig. 8 is a vertical section on a plane indicated by the line VIII—VIII Fig. 7.

While the batch-charging opening may be made through any part of the furnace envelop as cap or side wall, it is preferred to utilize the opening in the tuilles 1, as these openings are now utilized for observing the transformation of the batch and for regulating the temperature of the furnace, and would not involve any change in the structure of the furnace, such openings being above the tops of the pots and intermediate adjacent pots as is clearly shown in Figs. 1 and 2. The batch properly mixed is placed in a hopper 2 preferably with a valve at the bottom, which is conveyed by a cart or other means to a suitable place under the crane bridge 3. The hopper is then raised by the trolley 4 and adjusted to position over the basin 5 forming the mouth of the guiding pipe or tube 6. This tube is rotatably supported on a platform 7, which is pivotally supported as at 19 in a frame 18 detachably connected to the bridge. This construction will permit of the lower end of the tube being swung to feed position over either of the pots as hereinafter stated. This frame may be attached to the bridge in any suitable manner as for example by hooks 9 pivotally secured to the frame and adapted to engage pins 10 on the bridge. It is preferred that the tube 6 be so supported by the bridge or other suitable support that the axis of rotation of the tube as hereinafter described should be vertically above the opening through which the lower end of the tube is inserted. In order to move the lower end of the tube into and out of the furnace the tube is made in two sections which are so connected by a joint 11 that an oscillating movement can be imparted to the lower portion of the tube. As shown in Fig. 1 the tube is so curved that when the lower end is swung on the pivoted joint 11 it can be moved into and out of the furnace, and when so inserted the discharge end of the tube can be brought over either of the pots by rotating the tube on its platform 7. The internal diameter of the tube at its upper or receiving end is preferably made smaller than the other portions thereof and it is preferred that the internal dimensions should gradually increase from the upper to the lower end as shown. By reason of this construction the material while being guided by the tube will have a practically free fall i. e. its movement will not be materially checked or arrested by contact with the walls of the tube. As there will not be any material frictional resistance to the movement of the batch through the vertical portion of the tube it will acquire sufficient velocity to traverse when deflected by the portion $a$ of the tube, through the lower portion thereof which although nearly horizontal has sufficient downward pitch to allow of the uninterrupted passage of the batch.

It will be readily understood by those skilled in the art, that unless provision is made to prevent it, there will be a very strong draft of hot air or gases up through the feed tube when its lower end is inserted into the furnace, and that such draft unless checked would carry up a large proportion of the finely divided and desiccated batch material. The location of the contracted portion or throat of the tube at its upper end and adjacent to the basin permits of the closure of the tube by the material and thereby prevents an up draft which would interfere with the feed.

As shown in Figs. 3 and 4, arms 12 may be substituted for the hooks 9 said arms being provided with grooved wheels 13 which by turning up the arms while the tube is supported by the trolley 4, can be placed on the bridge 3 or other rails 14 attached to the bridge 3 or other overhead support. When the tube is so mounted, the joint 11 can be omitted as the lower end of the tube can be moved into and out of the furnace by shifting the platform 7 along the bridge. This movement of the platform and depending tube can be effected by any suitable means as for example by a fluid pressure cylinder 15 carried by the bridge. The piston rod 16 is detachably connected to the platform by a movable arm 17.

As furnaces are generally constructed so as to contain two rows of pots, provision is made for shifting the platform and depending tube from one side of the furnace to the other. In the construction shown in Figs. 3 and 4, the piston in the cylinder 15 is provided with oppositely projecting piston rods 16, 16ª and when it is desired to shift the tube from one side of the furnace to the other, the arm 17 is disconnected from the piston rod, the platform shifted along past the cylinder, and the opposite rod 16ª connected to the platform by an arm 17ª.

In the construction shown in Fig. 1 the bridge is provided with two sets of properly located pins 10 and the tube is moved from one position to the other by the trolley 4 which is also utilized to remove the tube to any suitable place after the charging of the pots has been effected, thus leaving the crane free to be used for any other purpose such as elevating the hopper containing the batch, and placing the pots in the furnace and removing them.

By supporting the platform 7 on pivot pins 19 as in Fig. 1 the accurate adjustment of the crane bridge with reference to the openings in the furnace envelop is not necessary, as the lower end of the tube 6 can be swung through a considerable arc on the pivot pins 19.

As shown in Fig. 6 the platform 7 carrying the guide tube may have a universally movable support. In this construction the arms 12 are hinged to a frame 22 within which a second frame 20 is supported by pivot pins 23. The platform 7 is supported within the second frame 20 by pivot pins 21 This construction permits of the lower portion of the tube 6 being swung in any direction thus facilitating its insertion into the furnace without accurately shifting of the crane bridge and the platform 7 along the crane bridge.

The guide tube 6 may be supported by any suitable means as for example by the traveling crane generally employed in connection with the furnace for placing pots in and removing them from the furnace as shown in Figs. 1 and 2. In charging batch into the pots the trolley 4 is employed for so lifting the tube and parts connected thereto that it may be attached to the crane bridge 3 by the hooks 9 as in Fig. 1 or by the arms 12 as in Fig. 3. The bridge 3 is then moved to or approximately to position over the opening in the furnace envelop. During this movement of the bridge the lower end of the tube is drawn back if the position of the platform on the crane bridge is fixed as in Fig. 1 or the whole tube is moved back from the furnace when the platform is adjustably mounted in the bridge as in Fig. 3. After the crane bridge has been shifted the lower end of the tube is pushed into the furnace and the tube turned on the platform to bring the discharge end over one of the pots. The hopper containing the batch having been raised by the trolley and moved in position relative to the basin 5, the valve in the bottom of the hopper is opened permitting the material to flow into the basin and from thence to drop through the tube.

In the construction shown in Figs. 1 and 3 the batch is brought to position below the crane on trucks and the hopper 2 containing sufficient material for charging one two or more pots is raised by the trolley 4 and shifted to position over the feed tube which had been previously adjusted to position on the crane bridge as stated.

In Figs. 7 and 8 is shown a form of apparatus in which a row of bins 24 is arranged above but parallel with the front of the furnace. The batch is carried to these bins by any suitable means preferably an endless chain 25 provided with buckets. This chain extends from the car 26 or a storage bin in which the mixed materials are charged, over the charging bins 24 which are provided with valved spouts 27 for directing the material into the feed tube. The feed tube is movably connected to a suitable support whereby it can be shifted to feed positions, as hereinafter described. Either the traveling crane can be used to support the tube or a trolley 28 movably along tracks 29 arranged in such relation to the spouts 27 that the tube 6ª can be shifted from spout to spout as required. As shown, in Fig. 8 the tube is so connected to the trolley that its lower end can be shifted laterally as required. The tube is made continuous from the trolley to its discharge end and the bins are placed at such a height relative to the opening in the furnace through which the tube is to be inserted, that the tube will be so nearly vertical that the material will have a practically free flow. When the opening in the tuille plate is used for charging the lower portion of the tube is bent to an angle to the vertical portion, but this angularly arranged portion is so short that the material will flow through it at nearly the velocity it has in passing through the vertical portion of the tube. The invention claimed herein is not limited to any specific location of the hole in the furnace envelop and it will be readily understood that by making a hole in the furnace envelop at higher point than that in the tuille plate, the tube may be made straight from end to end. As in this construction the support for the tube which corresponds to the center of oscillation of its inner end from pot to pot, is a considerable distance from the wall of the furnace the tube will have to be placed at angles to the wall of the furnace in order that the inner end may be adjusted over the pots. Hence the spouts 27 are so spaced that when the inner end of the tube is over one pot the receiving end of the tube will be in line with one of the spouts. After that pot is filled the trolley or crane is moved along to another spout thereby changing the angular position of the spout and with relation to the furnace and permitting the inner end of the tube to be shifted over the other spout. The tube can be inserted and withdrawn by shifting the trolley along its track, the tube being connected to the trolley so that its free end can be freely moved horizontally and vertically. When not in use the tube can be swung parallel with the line of bins and will not interfere with other operations around the furnace.

As above stated it is preferred that the material should have freedom of movement through the tube and should not have opportunity of becoming compacted in the tube and its velocity reduced or checked. This end can be attained by so regulating the valve in the hopper that sufficient quantity of the batch can not enter the tube at one time to fill the tube; or this regulation of the material can be effected automatically by reducing the internal diameter of the tube at or adjacent to its upper end as stated. While moving vertically each particle of the batch will attain such velocity that it will also move sufficiently far horizontally to enter the pot. In the construction shown the material moves vertically and is then sharply deflected and flows horizontally or nearly so, but it will be readily understood by those skilled in the art, that the general direction of movement of the material in Figs. 1 and 2 is practically a component of the vertical and horizontal movements as it is in fact in Figs. 7 and 8. After one pot has been filled the valve in the hopper or spout is closed and the pipe or tube turned axially on the platform 7 as in Figs. 1 and 3, or shifted laterally as in Figs. 7 and 8 thereby shifting the inner end of the pipe over the other pot. The valve in the hopper or spout is then opened allowing the material to flow in to the second pot.

In case the batch should cut the wall of the pot the discharge end of the tube can be shaped as shown in Fig. 3 thus providing a lip b against which the material would strike and be deflected down into the pot.

It is characteristic of my improvement in feeding the batch that each individual particle will acquire in its vertical movement sufficient velocity to carry it the required distance horizontally, even when the entire horizontal movement is continuous, and the horizontal portion of the tube has a downward inclination less than the angle of repose of the materials forming the batch.

It is believed that in the practice of my invention both pots can be charged in about two minutes so that by making the wall of the portion of the tube which enters the furnace sufficiently thick the use of cooling means as the circulating of water in such part of the tube, will not be necessary in most cases.

I claim herein as my invention:

1. As an improvement in the art of feeding materials to glass pots the method herein described which consists in feeding finely divided and desiccated material through a tube extending into the furnace to a point adjacent to the pot and preventing any flow of air or gas through said tube in opposition to the direction of flow of the material.

2. As an improvement in the art of feeding materials to glass pots, the method herein described which consists in causing the finely divided and desiccated material to drop through a tube extending into the furnace to a point adjacent to the pot and during the charging operation maintaining a sufficient supply of the material at a point in the tube to prevent an up draft of air or gas through the tube.

3. As an improvement in the art of charging pots in furnaces, the method herein described, which consists in permitting a finely divided and desiccated material to be moved solely by gravity, directing the material without interfering with its gravity movement through an opening into a pot arranged in the furnace, and protecting the material in its movement from reversely flowing air or gas.

4. A pot furnace provided with an opening located above and intermediate adjacent pots arranged in the furnace in combination with a pipe or tube adapted to be inserted through such opening and means so supporting the tube that its inner end may be shifted to feed position over the pots adjacent to the opening.

5. A pot furnace provided with an opening located above and intermediate adjacent pots arranged in the furnace, in combination with a tube suspended above and adapted to project into the furnace and movable laterally and around its axis.

6. A pot furnace provided with an opening located above and intermediate adjacent pots arranged in said furnace in combination with a vertically supported feed tube having an internal diameter adjacent to its upper or receiving end less than that of its lower or delivery portions and adapted to be inserted into the furnace and removed therefrom.

7. A pot furnace in combination with feed tube having a reduced internal diameter adjacent to its upper or inlet end said tube being adapted to be inserted into the furnace with its discharge end in position to deliver material into a pot means for supporting the tube in feed position and means for delivering the material into the tube at a point above its reduced diameter.

8. A pot furnace in combination with an elevated support, a tube rotatable on its axis suspended from said support and means for shifting the tube for insertion of its lower end into and out of the furnace.

9. A pot furnace in combination with an overhead support, a frame detachably connected to the support, a feed tube rotatable on its axis supported by the frame and means for inserting the lower end of the tube into the furnace.

10. A pot furnace in combination with an overhead support, a frame movably mounted on said support, a feed tube rotatable on its axis mounted on the frame and means for shifting the frame along the support.

11. A pot furnace provided with an opening located above and intermediate adjacent pots arranged in the furnace in combination with an elevated bin extending in the direction of the furnace, spouts extending from the bin, a support movable along the line of spouts, a pipe or tube having one end carried by said support and extending downwardly toward and into the furnace and adapted to be adjusted to feed position over adjacent pots.

In testimony whereof, I have hereunto set my hand.

HALBERT K. HITCHCOCK

Witnesses:
 ALICE A. TRILL,
 THOMAS JOYCE.